United States Patent Office.

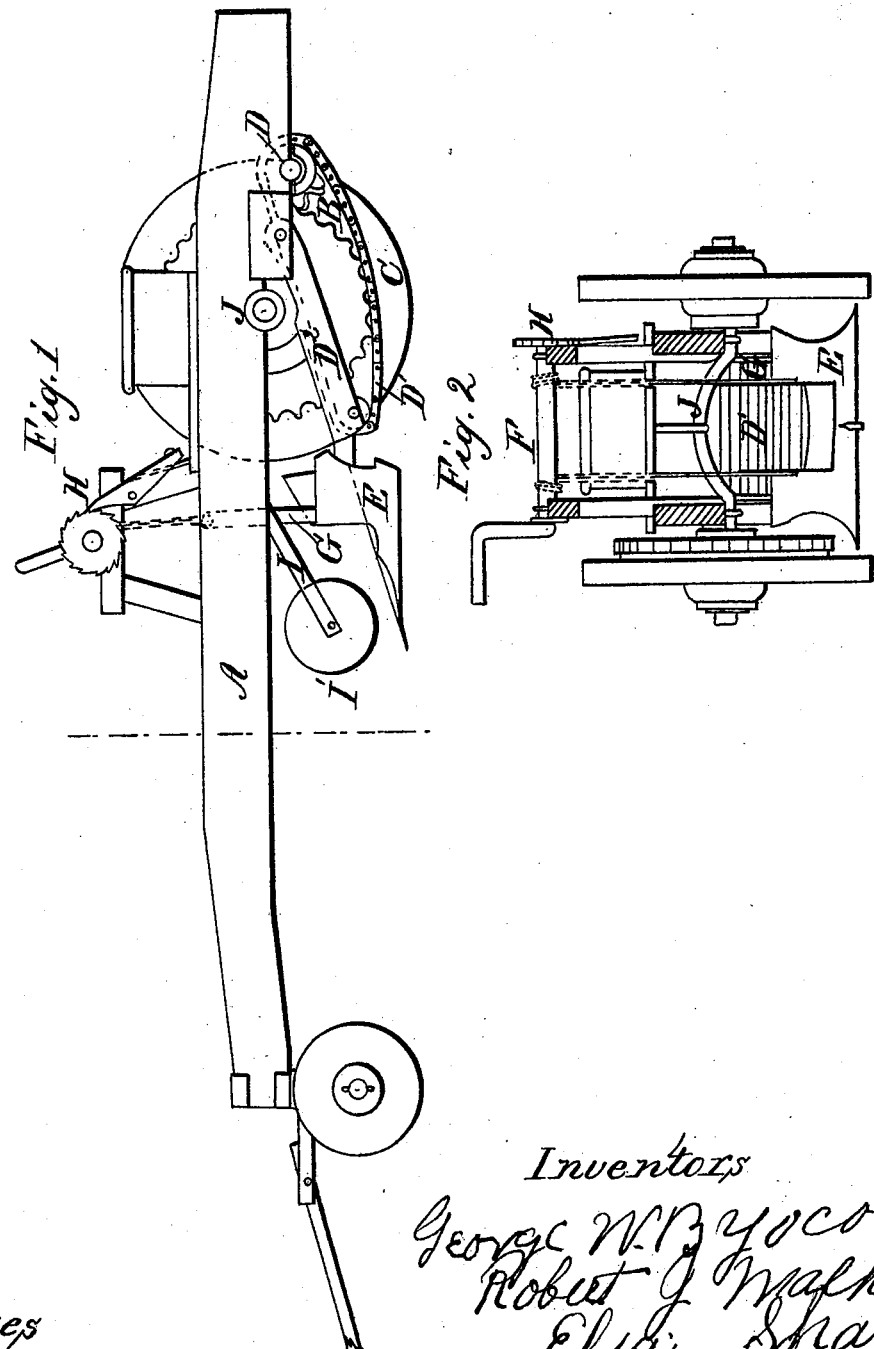

GEORGE W. B. YOCOM, ROBERT J. WALKER, AND ELIAS SHARP, OF ARCATA, CALIFORNIA.

Letters Patent No. 96,370, dated November 2, 1869.

IMPROVEMENT IN POTATO-DIGGERS.

The Schedule referred to in these Letters Patent and making part of the same.

*To all whom it may concern:*

Be it known that we, GEORGE W. B YOCOM, ROBERT J. WALKER, and ELIAS SHARP, of Arcata, Humboldt county, and State of California, have invented certain new and useful Improvements in Potato-Digging Machines; and we do hereby declare that the following description and accompanying drawings are sufficient to enable any person skilled in the art or science to which it most nearly appertains, to make and use our said invention or improvements, without further invention or experiment.

Our invention consists of a plow with open throat, through which the potatoes and dirt pass on to an endless chain-carrier, which is caused to rotate by means of a gear-connection attached to one end of the driving-wheels.

The forward end of the carrier and plow is so arranged as to be raised and lowered to cut the desired depth, and elevate the contents of the hill or row, the width of which is marked and cut by revolving cutters at each side of the plow.

Referring to the accompanying drawings—

Figure 1 is a side elevation, with one driving-wheel removed.

Figure 2, a transverse section, taken in front of the plow.

The frame A, which supports the machinery, is mounted on four wheels, and the endless carrier operates between the driving-wheels, by means of the spur and pinions B, on the spindle and inner face of the wheel C.

The spindle D also carries the ways upon which operate the endless chains, and prevent them from slipping, by means of cogs or projections, which pass between the openings of the rods which form the carrier $D^1$.

Arms $D^2 D^2$ are hinged to the frame, through which the spindle or axis which carries the lower end of the elevator passes, and the plow E is rigidly attached to these arms, and both the plow and carrier is raised and lowered at once by a windlass, F, placed at the top of the frame, which has a chain-connection with the upright standard G G of the plow. By this means, a greater or less inclination is imparted to the plow and carrier, and the position is maintained by a pawl and ratchet, H, at one end of the windlass.

Arms I I extend forward from the plow-standard, and are provided with forked ends, on which circular cutting-plates or knives $I' I'$ revolve, to cut vertically the width of the row or hills.

In the operation of our machine, the plow cuts below the hill or row, and the potatoes and dirt enter the throat of the plow, and pass up the carrier, the dirt sifting between the opening of the transverse rods, falls to the ground, and the potatoes are carried along and dropped at the upper end of the carrier.

The axle J is curved upward, to provide a passageway for the carrier, debris, and potatoes.

Having thus described our invention,

What we claim, and desire to secure by Letters Patent, is—

The potato-digger described, consisting of the plow E, with open throat and double shares, hinged arms $D^2$, cam $D^1$, cutters I', and windlass H, the whole being combined and arranged as described, for the purpose set forth.

In testimony whereof, we have hereunto set our hands and seals.

G. W. B. YOCOM. [L. S.]
ROBERT J. WALKER. [L. S.]
ELIAS SHARP. [L. S.]

Witnesses:
BYRON DEMING,
G. P. DOW.